(12) United States Patent
Li et al.

(10) Patent No.: US 11,057,889 B2
(45) Date of Patent: Jul. 6, 2021

(54) RESOURCE ALLOCATION METHOD, USER EQUIPMENT, AND NETWORK DEVICE

(71) Applicant: Huawei Technologies Co., Ltd., Shenzhen (CN)

(72) Inventors: Junchao Li, Shanghai (CN); Hao Tang, Shanghai (CN); Fan Wang, Berkshire (GB); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 52 days.

(21) Appl. No.: 16/673,219

(22) Filed: Nov. 4, 2019

(65) Prior Publication Data

US 2020/0084773 A1 Mar. 12, 2020

Related U.S. Application Data

(63) Continuation of application No. PCT/CN2018/085057, filed on Apr. 28, 2018.

(30) Foreign Application Priority Data

May 5, 2017 (CN) .......................... 201710314022.9

(51) Int. Cl.
*H04L 12/28* (2006.01)
*H04W 72/04* (2009.01)
(Continued)

(52) U.S. Cl.
CPC ..... *H04W 72/0453* (2013.01); *H04W 56/001* (2013.01); *H04W 76/27* (2018.02); *H04W 74/0833* (2013.01)

(58) Field of Classification Search
CPC .......................... H04W 72/04; H04W 72/0453
(Continued)

(56) References Cited

U.S. PATENT DOCUMENTS

| | | |
|---|---|---|
| 2010/0075686 A1 | 3/2010 | Bhattad et al. |
| 2011/0075703 A1 | 3/2011 | Jiang et al. |

(Continued)

FOREIGN PATENT DOCUMENTS

| | | |
|---|---|---|
| CN | 101610101 A | 12/2009 |
| CN | 102088434 A | 6/2011 |

(Continued)

OTHER PUBLICATIONS

New Postcom, "Remaining issues for downlink reference signals for CoMP," 3GPP TSG RAN WG2 Meeting #69, R1-122368J, Prague, Czech Republic, May 21-15, 2012, 2 pages.

(Continued)

*Primary Examiner* — John Pezzlo
(74) *Attorney, Agent, or Firm* — Slater Matsil, LLP

(57) ABSTRACT

This application provides a resource allocation method which includes: determining a first location of a first frequency domain resource; determining a second location of at least one bandwidth part based on the first location and an offset between the first location and the second location; determining the at least one bandwidth part based on the second location of the at least one bandwidth part and a bandwidth size of the at least one bandwidth part; and transmitting at least one of physical signal information and physical channel information in a first bandwidth part, where the first bandwidth part includes one or more bandwidth parts in the at least one bandwidth part.

28 Claims, 6 Drawing Sheets

(51) Int. Cl.
*H04W 76/27* (2018.01)
*H04W 56/00* (2009.01)
*H04J 1/16* (2006.01)
*H04W 74/08* (2009.01)

(58) Field of Classification Search
USPC .................................. 370/252, 329, 386, 430
See application file for complete search history.

(56) References Cited

U.S. PATENT DOCUMENTS

| | | | |
|---|---|---|---|
| 2018/0192409 A1 | 7/2018 | Yang et al. | |
| 2018/0199227 A1 | 7/2018 | Huang et al. | |
| 2018/0270698 A1* | 9/2018 | Babaei | H04W 28/0278 |
| 2018/0270699 A1* | 9/2018 | Babaei | H04W 72/1284 |

FOREIGN PATENT DOCUMENTS

| | | |
|---|---|---|
| CN | 102160448 A | 8/2011 |
| CN | 106332286 A | 1/2017 |
| CN | 106535330 A | 3/2017 |
| CN | 108347778 A | 7/2018 |
| CN | 110574312 A | 12/2019 |
| EP | 3562239 A1 | 10/2019 |
| EP | 3595199 A1 | 1/2020 |
| JP | 2016131396 A | 7/2016 |
| WO | 2016182050 A1 | 11/2016 |
| WO | 2018137577 A1 | 8/2018 |
| WO | 2018190678 A1 | 10/2018 |

OTHER PUBLICATIONS

Samsung, "Resource Allocation Aspects," 3GPP TSG RAN WG1 Meeting #88bis, R1-1705399, Spokane, WA, USA, Apr. 3-7, 2017, 6 pages.
Ericsson, "On Resource Allocation for UEs not Supporting the Full Carrier Bandwidth," TSG-RAN WG1#88bis, R1-1706046, Spokane, WA, USA, Apr. 3-7, 2017, 1 page.
3rd Generation Partnership Project; Technical Specification Group Radio Access Network; NR; Radio Resource Control (RRC); Protocol specification (Release 15 ), 3GPP TS 38.331 V0.0.2 (Mar. 2017), 13 pages.
Huawei, "Email discussion [86b-20] on synchronization and carrier rasters for NR," 3GPP TSG RAN WG1 Meeting #87, R1-1611684, Reno, USA, Nov. 14-18, 2016, 12 pages.
ZTE et al, "SS frequency raster," 3GPP TSG RAN WG1 Meeting #88bis, R1-1704359, Spokane, USA Apr. 3-7, 2017, 6 pages.
Huawei et al., "Resource allocation and indication for data channel", 3GPP TSG RAN WG1 #88b R1-1705069, Apr. 3-7, 2017, 9 pages.

* cited by examiner

RESOURCE ALLOCATION METHOD, USER EQUIPMENT, AND NETWORK DEVICE

CROSS-REFERENCE TO RELATED APPLICATIONS

This application is a continuation of International Application No. PCT/CN2018/085057, filed on Apr. 28, 2018, which claims priority to Chinese Patent Application No. 201710314022.9, filed on May 5, 2017. The disclosures of the aforementioned applications are hereby incorporated by reference in its entireties.

TECHNICAL FIELD

This application relates to the communications field, and more specifically, to a resource allocation method, user equipment, and a network device.

BACKGROUND

In Long Term Evolution (LTE), allocation of frequency domain resources in a bandwidth part for user equipment (UE) needs to depend on a bandwidth size of a system bandwidth. However, in a $5^{th}$ generation mobile communications (5G) new radio (NR) system, UE may not know the value of the system bandwidth. Therefore, there is an urgent need to design a method for determining, without depending on the value of the system bandwidth, locations of the frequency domain resources in the bandwidth part for the UE.

SUMMARY

This application provides a resource allocation method, user equipment, and a network device, to determine a location of a frequency domain resource in a bandwidth part without depending on a value of a system bandwidth.

According to a first aspect, a resource allocation method is provided. The method includes: determining a first location of a first frequency domain resource; determining a second location of at least one bandwidth part based on the first location and an offset between the first location and the second location; determining the at least one bandwidth part based on the second location of the at least one bandwidth part and a bandwidth size of the at least one bandwidth part; and transmitting at least one of physical signal information and physical channel information in a first bandwidth part, where the first bandwidth part includes one or more bandwidth parts in the at least one bandwidth part.

UE determines the first location of the first frequency domain resource, determines the second location based on the first location and an offset between the first location and the second location of each bandwidth part in the at least one bandwidth part, determines a frequency domain resource in the at least one bandwidth part based on the second location of the at least one bandwidth part and the bandwidth size of the at least one bandwidth part, and transmits at least one of the physical signal information and the physical channel information in the first bandwidth part in the at least one bandwidth part. In this way, the UE can determine a location of the frequency domain resource in the bandwidth part without depending on a value of a system bandwidth.

In some possible implementations, the offset between the first location and the second location of the at least one bandwidth part may include an offset value and an offset direction between the first location and the second location of the at least one bandwidth part.

In some possible implementations, the first location is a start location, a central location, or an end location of the first frequency domain resource, and the second location is a start location, a central location, or an end location of the bandwidth part.

The UE may determine the start location, the central location, or the end location of the bandwidth part by using the start location, the central location, or the end location of the first frequency domain resource as a reference point. In this way, the UE determines the location of the frequency domain resource in the bandwidth part without depending on the value of the system bandwidth.

In some possible implementations, a granularity of the offset value is any one of a resource block RB, a resource block group PBG, or a sub-bandwidth.

If the bandwidth part is a first common bandwidth part, the granularity of the offset value may be an RB or a PBG. If the bandwidth part is a second common bandwidth part, the granularity of the offset value may be an RB, a PBG, or a sub-bandwidth. The first common bandwidth part is a common bandwidth part for initial access, and the second common bandwidth part is other common bandwidth parts than the common bandwidth part for initial access. Based on the first location of the first frequency domain resource and the granularity of the offset value, the UE can accurately determine the second location of the bandwidth part, thereby improving accuracy of determining the frequency domain resource.

In some possible implementations, before the transmitting at least one of physical signal information and physical channel information in a first bandwidth part in the at least one bandwidth part, the method further includes: receiving first indication information, where the first indication information is used to indicate the first bandwidth part in the at least one bandwidth part; and determining the bandwidth part based on the first indication information.

If the offset between the second location of the bandwidth part and the first location of the first frequency domain resource is preset by the UE and a network device, the UE may receive the first indication information that is sent after the network device determines the first frequency domain resource, and determine the first bandwidth part in the at least one bandwidth part based on the first indication information. In this way, the network device does not need to configure an offset of the second location of each bandwidth part relative to the first location of the first frequency domain resource, thereby reducing power consumption of the network device.

In some possible implementations, before the determining the second location, the method further includes: receiving second indication information, where the second indication information is used to indicate the offset between the first location and the second location.

The UE may receive the second indication information sent by the network device, and determine the offset between the first location and the second location based on the second indication information, thereby improving flexibility of resource allocation of the bandwidth part.

In some possible implementations, the receiving second indication information includes: receiving a master information block, where the master information block carries the second indication information; or receiving a system information block, where the system information block carries the second indication information.

The UE may receive the second indication information carried in the master information block or the system information block, so that the network device does not need to separately send the second indication information, thereby reducing the power consumption of the network device.

In some possible implementations, when the UE is not in a random access process, the receiving second indication information includes: receiving Radio resource control signaling, where the Radio resource control signaling carries the second indication information.

When the UE is not in a random access process, the UE may further obtain the second indication information by receiving the radio resource control signaling, thereby reducing the power consumption of the network device.

In some possible implementations, when the UE is in a random access process, the receiving second indication information includes: receiving random access response signaling, where the random access response signaling carries the second indication information.

When the UE is in a random access process, the UE may further obtain the second indication information by receiving the random access response signaling, thereby reducing the power consumption of the network device.

In some possible implementations, the first frequency domain resource is a frequency domain resource of a synchronization signal block.

The first frequency domain resource may be the frequency domain resource of the synchronization signal block. That is, the UE may first receive a synchronization signal block, and determine a frequency domain resource of the received synchronization signal block as the first frequency domain resource.

In some possible implementations, the bandwidth part is a common bandwidth part, and the common bandwidth part is used for the user equipment UE to receive at least one of common physical signal information, common physical downlink control channel information, and common physical downlink shared channel information.

The UE may determine a frequency domain resource in the common bandwidth part by using the frequency domain resource of the synchronization signal block as a reference point. The UE may receive at least one of the common physical signal information, the common physical downlink control channel information, and the common physical downlink shared channel information in the common bandwidth part.

In some possible implementations, if the common bandwidth part is used to transmit the synchronization signal block, a start location of the common bandwidth part needs to satisfy the following condition: $n_{ss}^{low} - W_{min} + m \leq n_{CCRS1}^{low} \leq n_{ss}^{low} + W_{min} - w_1$. $n_{CCRS1}^{low}$ is the start location of the common bandwidth part, $n_{ss}^{low}$ is a start location of the frequency domain resource of the synchronization signal block, $W_{min}$ is a minimum UE bandwidth capability, m is a transmission bandwidth of the synchronization signal block, and $w_1$ is the common bandwidth part.

In some possible implementations, if the common bandwidth part is used to transmit the synchronization signal block, a central location of the common bandwidth part needs to satisfy the following condition: $n_{ss}^{low} - W_{min} + m + \lfloor w_1/2 \rfloor \leq n_{CCRS1}^{mid} \leq n_{ss}^{low} + W_{min} - \lfloor w_1/2 \rfloor$. $n_{CCRS1}^{mid}$ is the central location of the common bandwidth part, $n_{ss}^{low}$ is a start location of the frequency domain resource of the synchronization signal block, $W_{min}$ is a minimum UE bandwidth capability, m is a transmission bandwidth of the synchronization signal block, and $w_1$ is the common bandwidth part.

In some possible implementations, if the common bandwidth part is used to transmit the synchronization signal block, an end location of the common bandwidth part needs to satisfy the following condition: $n_{ss}^{low} - W_{min} + m + w_1 \leq n_{CCRS1}^{high} \leq n_{ss}^{low} + W_{min}$. $n_{CCRS1}^{high}$ is the end location of the common bandwidth part, $n_{ss}^{low}$ is a start location of the frequency domain resource of the synchronization signal block, $W_{min}$ is a minimum UE bandwidth capability, m is a transmission bandwidth of the synchronization signal block, and $w_1$ is the common bandwidth part.

In some possible implementations, the bandwidth part is a UE specific downlink bandwidth part, and the UE specific downlink bandwidth part is used for the UE to receive at least one of UE specific downlink physical signal information, UE specific physical downlink control channel information, and UE specific physical downlink shared channel information.

Alternatively, the UE may determine the UE specific downlink bandwidth part by using the frequency domain resource of the synchronization signal block as a reference point. The UE may receive at least one of the UE specific downlink physical signal information, the UE specific physical downlink control channel information, and the UE specific physical downlink shared channel information in the UE specific downlink bandwidth part.

In some possible implementations, the first frequency domain resource is a UE specific downlink bandwidth part, and the bandwidth part is a UE specific uplink bandwidth part. The UE specific downlink bandwidth part is used for the UE to receive at least one of UE specific physical downlink control channel information and UE specific physical downlink shared channel information, and the UE specific uplink bandwidth part is used for the UE to send at least one of UE specific uplink physical signal information, UE specific physical uplink control channel information, and UE specific physical uplink shared channel information.

The UE may determine a location of a resource in the UE specific uplink bandwidth part by using a location of a frequency domain resource in the UE specific downlink bandwidth part as a reference point, thereby avoiding resource allocation performed depending on a value of a system bandwidth.

In some possible implementations, the first location is a central location of an uplink carrier bandwidth and the bandwidth part is the UE specific uplink bandwidth part. The UE specific uplink bandwidth part is used for the UE to send at least one of the UE specific uplink physical signal information, the UE specific physical uplink control channel information, and the UE specific physical uplink shared channel information.

The UE may determine a location of a resource in the UE specific uplink bandwidth part by using the central location of the uplink carrier bandwidth as a reference point, thereby avoiding resource allocation performed depending on a value of a system bandwidth.

In some possible implementations, the first frequency domain resource is a common bandwidth part and the bandwidth part is a UE specific uplink bandwidth part or a UE specific downlink bandwidth part. The UE specific downlink bandwidth part is used for the UE to receive at least one of UE specific downlink physical signal information, UE specific physical downlink control channel information, and UE specific downlink shared channel information, and the UE specific uplink bandwidth part is used for the UE to send at least one of UE specific uplink physical signal information, UE specific physical uplink control channel information, and UE specific physical uplink shared channel information.

The UE may determine the UE specific uplink bandwidth part based on a frequency domain resource in the common bandwidth part, or determine a frequency domain resource in the UE specific downlink bandwidth part based on a frequency domain resource in the common bandwidth part, thereby avoiding resource allocation of UE specific bandwidth parts performed depending on the value of the system bandwidth.

According to a second aspect, a resource allocation method is provided. The method includes: sending second indication information, where the second indication information is used to indicate an offset between a first location of a first frequency domain resource and a second location of at least one bandwidth part; and transmitting at least one of physical signal information and physical channel information in a first bandwidth part, where the first bandwidth part includes one or more bandwidth parts in the at least one bandwidth part.

The network device flexibly configures the offset between the first location and the second location, so that UE determines the second location based on the second indication information, thereby improving flexibility of resource allocation.

In some possible implementations, the offset between the first location and the second location of the at least one bandwidth part may include an offset value and an offset direction between the first location and the second location of the at least one bandwidth part.

In some possible implementations, the first location is a start location, a central location, or an end location of the first frequency domain resource, and the second location is a start location, a central location, or an end location of the bandwidth part.

In some possible implementations, a granularity of the offset value is any one of a resource block RB, a resource block group PBG, or a sub-bandwidth.

In some possible implementations, the method further includes: determining the first bandwidth part in the at least one bandwidth part; and sending first indication information, where the first indication information is used to indicate the first bandwidth part in the at least one bandwidth part.

The network device instructs, by using the first indication information, the UE to determine the first bandwidth part in the at least one bandwidth part, thereby reducing power consumption of the UE.

In some possible implementations, the sending second indication information includes: sending a master information block, where the master information block carries the second indication information; or sending a system information block, where the system information block carries the second indication information.

The network device does not need to separately send the second indication information, thereby reducing power consumption of the network device.

In some possible implementations, when the UE is not in a random access process, the sending second indication information includes: sending radio resource control signaling, where the radio resource control signaling carries the second indication information.

The network device does not need to separately send the second indication information, thereby reducing the power consumption of the network device.

In some possible implementations, when the UE is in a random access process, the sending second indication information includes: sending random access response signaling, where the random access response signaling carries the second indication information.

In some possible implementations, the first frequency domain resource is a frequency domain resource of a synchronization signal block.

The first frequency domain resource may be the frequency domain resource of the synchronization signal block. That is, the UE may first receive a synchronization signal block, and determine a frequency domain resource of the received synchronization signal block as the first frequency domain resource.

In some possible implementations, the bandwidth part is a common bandwidth part, and the common bandwidth part is used for the user equipment UE to receive at least one of common physical signal information, common physical downlink control channel information, and common physical downlink shared channel information.

The network device may indicate, by using the second indication information, an offset between a location of the common bandwidth part and a location of the frequency domain resource of the synchronization signal block, so that the UE determines a location of a frequency domain resource in the common bandwidth part based on the second indication information and the location of the frequency domain resource of the synchronization signal block.

In some possible implementations, if the common bandwidth part is used to transmit the synchronization signal block, a start location of the common bandwidth part and a start location of the synchronization signal block need to satisfy the following condition: $n_{ss}^{low} - W_{min} + m \leq n_{CCRS1}^{low} \leq n_{ss}^{low} + W_{min} - w_1$. $n_{CCRS1}^{low}$ is the start location of the common bandwidth part, $n_{ss}^{low}$ is the start location of the frequency domain resource of the synchronization signal block, $W_{min}$ is a minimum UE bandwidth capability, m is a transmission bandwidth of the synchronization signal block, and $w_1$ is the common bandwidth part.

In some possible implementations, if the common bandwidth part is used to transmit the synchronization signal block, a central location of the common bandwidth part and a start location of the synchronization signal block need to satisfy the following condition: $n_{ss}^{low} - W_{min} + m + \lfloor w_1/2 \rfloor \leq n_{CCRS1}^{mid} \leq n_{ss}^{low} + W_{min} - \lfloor w_1/2 \rfloor$. $n_{CCRS1}^{mid}$ is the central location of the common bandwidth part, $n_{ss}^{low}$ is the start location of the frequency domain resource of the synchronization signal block, $W_{min}$ is a minimum UE bandwidth capability, m is a transmission bandwidth of the synchronization signal block, and $w_1$ is the common bandwidth part.

In some possible implementations, if the common bandwidth part is used to transmit the synchronization signal block, an end location of the common bandwidth part and a start location of the synchronization signal block need to satisfy the following condition: $n_{ss}^{low} - W_{min} + m + w_1 \leq n_{CCRS1}^{high} \leq n_{ss}^{low} + W_{min}$. $n_{CCRS1}^{high}$ is the end location of the common bandwidth part, $n_{ss}^{low}$ is the start location of the frequency domain resource of the synchronization signal block, $W_{min}$ is a minimum UE bandwidth capability, m is a transmission bandwidth of the synchronization signal block, and $w_1$ is the common bandwidth part.

In some possible implementations, the bandwidth part is a UE specific downlink bandwidth part, and the UE specific downlink bandwidth part is used for the UE to receive at least one of UE specific downlink physical signal information, UE specific physical downlink control channel information, and UE specific physical downlink shared channel information.

The network device sends the second indication information, so that the UE can determine the UE specific downlink bandwidth part by using the frequency domain resource of the synchronization signal block as a reference point.

In some possible implementations, the first frequency domain resource is a UE specific downlink bandwidth part, and the bandwidth part is a UE specific uplink bandwidth part. The UE specific downlink bandwidth part is used for the UE to receive at least one of UE specific physical downlink control channel information and UE specific physical downlink shared channel information, and the UE specific uplink bandwidth part is used for the UE to send at least one of UE specific uplink physical signal information, UE specific physical uplink control channel information, and UE specific physical uplink shared channel information.

The network device sends the second indication information, so that the UE may determine a location of a resource in the UE specific uplink bandwidth part by using a location of a frequency domain resource in the UE specific downlink bandwidth part as a reference point, thereby avoiding resource allocation performed by the UE depending on a value of a system bandwidth.

In some possible implementations, the first location is a central location of the uplink carrier bandwidth and the bandwidth part is the UE specific uplink bandwidth part. The UE specific uplink bandwidth part is used for the UE to send at least one of the UE specific uplink physical signal information, the UE specific physical uplink control channel information, and the UE specific physical uplink shared channel information.

The network device sends the second indication information, so that the UE may determine a location of a resource in the UE specific uplink bandwidth part by using the central location of the uplink carrier bandwidth as a reference point, thereby avoiding resource allocation performed by the UE depending on a value of a system bandwidth.

In some possible implementations, the first frequency domain resource is a common bandwidth part and the bandwidth part is a UE specific uplink bandwidth part or a UE specific downlink bandwidth part. The UE specific downlink bandwidth part is used for the UE to receive at least one of UE specific downlink physical signal information, UE specific physical downlink control channel information, and UE specific downlink shared channel information, and the UE specific uplink bandwidth part is used for the UE to send at least one of UE specific uplink physical signal information, UE specific physical uplink control channel information, and UE specific physical uplink shared channel information.

The network device sends the second indication information, so that the UE may determine the UE specific uplink bandwidth part based on a frequency domain resource in the common bandwidth part, or determine a frequency domain resource in the UE specific downlink bandwidth part based on a frequency domain resource in the common bandwidth part, thereby avoiding resource allocation performed by the UE depending on the value of the system bandwidth.

According to a third aspect, UE is provided. The UE includes a module configured to perform the method according to any one of the first aspect or the possible implementations of the first aspect.

According to a fourth aspect, a network device is provided. The network device includes a module configured to perform the method according to any one of the second aspect or the possible implementations of the second aspect.

According to a fifth aspect, a system is provided. The system includes: the UE according to the third aspect and the network device according to the fourth aspect.

According to a sixth aspect, UE is provided. The UE includes a processor, a memory, and a communications interface. The processor and the memory are connected to the communications interface. The memory is configured to store an instruction, the processor is configured to execute the instruction, and the communications interface is configured to communicate with other network elements under control of the processor. When the processor executes the instruction stored in the memory, the processor is enabled to perform the method according to any one of the first aspect or the possible implementations of the first aspect.

According to a seventh aspect, a network device is provided. The network device includes a processor, a memory, and a communications interface. The processor and the memory are connected to the communications interface. The memory is configured to store an instruction, the processor is configured to execute the instruction, and the communications interface is configured to communicate with other network elements under control of the processor. When the processor executes the instruction stored in the memory, the processor is enabled to perform the method according to any one of the second aspect or the possible implementations of the second aspect.

According to an eighth aspect, a computer storage medium is provided. The computer storage medium stores program code, and the program code is used to execute an instruction for the method according to any one of the first aspect or the possible implementations of the first aspect.

According to a ninth aspect, a computer storage medium is provided. The computer storage medium stores program code, and the program code is used to execute an instruction for the method according to any one of the second aspect or the possible implementations of the second aspect.

Based on the foregoing technical solutions, the first location of the first frequency domain resource is determined, the second location is determined based on the first location and the offset value and the offset direction between the first location and the second location of the at least one bandwidth part, and the at least one bandwidth part is determined based on the bandwidth size of the at least one bandwidth part and the second location of the at least one bandwidth part, so that service data is sent in the at least one bandwidth part. In this way, resource allocation performed by the user equipment depending on the value of the system bandwidth is avoided, and the UE can allocate resources when not learning of the system bandwidth.

DETAILED DESCRIPTION OF ILLUSTRATIVE EMBODIMENTS

The following describes technical solutions of this application with reference to the accompanying drawings.

The technical solutions in embodiments of this application may be applied to various non-orthogonal multiple access technology-based communications systems, for example, a sparse code multiple access (SCMA) system and a low density signature (LDS) system. Certainly, the SCMA system and the LDS system may have other names in the communications field. Further, the technical solutions in the embodiments of this application may be applied to a multicarrier transmission system using the orthogonal multiple access technology, for example, orthogonal frequency division multiplexing (OFDM) using the orthogonal multiple access technology, filter bank multicarrier (FBMC), generalized frequency division multiplexing (GFDM), and a filtered orthogonal frequency division multiplexing (F-OFDM) system.

User equipment in the embodiments of this application may be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, user equipment in a future 5G network, or user equipment in a future evolved public land mobile network (PLMN). This is not limited in the embodiments of this application.

The network device in the embodiments of this application may be a device configured to communicate with a terminal device. The network device may be a base transceiver station (BTS) in Global System for Mobile Communications (GSM) or Code Division Multiple Access (CDMA), or may be a NodeB (NB) in a Wideband Code Division Multiple Access (WCDMA) system, or may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, or a network device in a future 5G network, or a network device in a future evolved PLMN network. This is not limited in the embodiments of the present invention.

Figure 1:
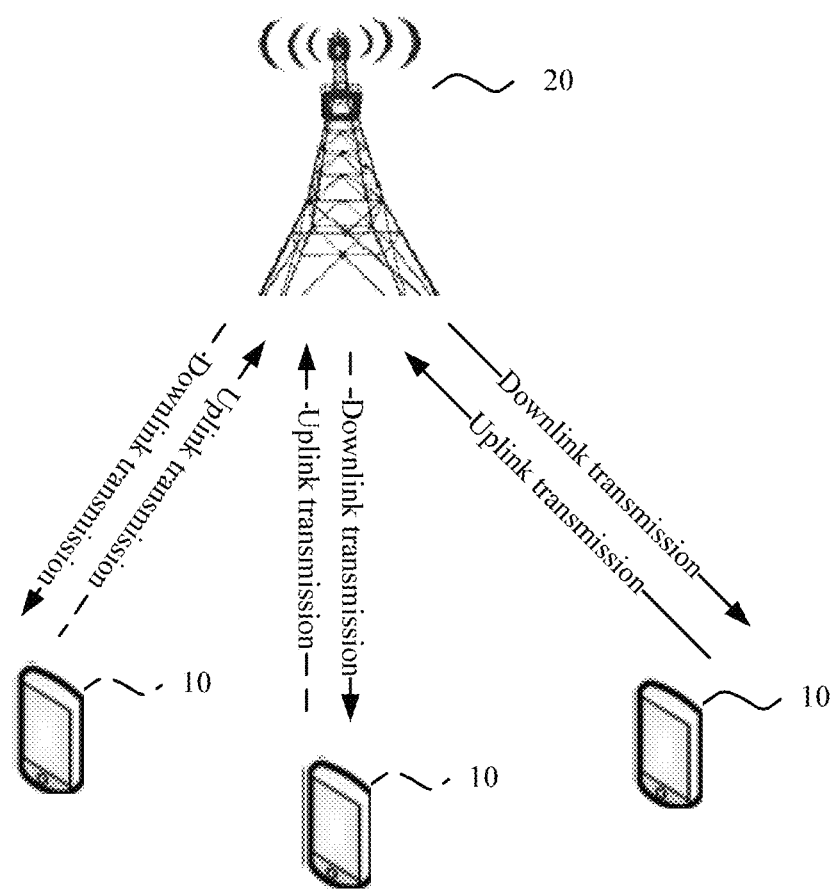
FIG. 1 is a schematic diagram of an application scenario according to this application.

FIG. 1 is a schematic diagram of an application scenario according to this application. A communications system in FIG. 1 may include user equipment 10 and a network device 20. The network device 20 is configured to provide a communications service for the user equipment 10 and connect the user equipment 10 to a core network. The user equipment 10 accesses a network by searching for a synchronization signal, a broadcast signal, or the like that are sent by the network device 20, to communicate with the network. Arrows shown in FIG. 1 may represent uplink/downlink transmission performed by using a cellular link between the user equipment 10 and the network device 20.

Figure 2:
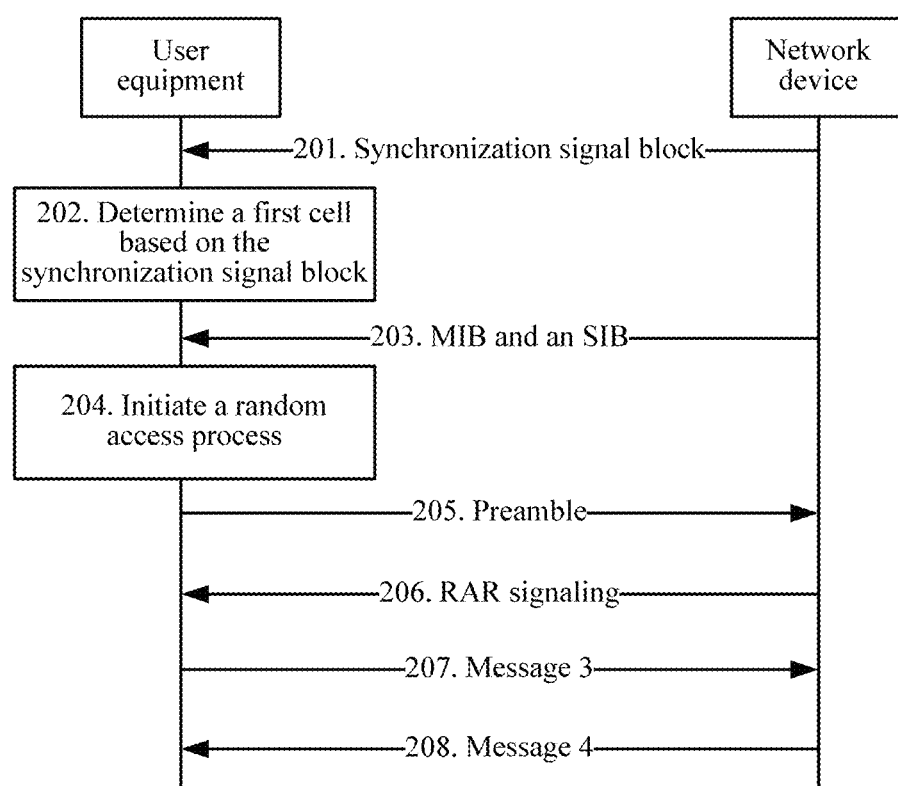
FIG. 2 is a schematic flowchart of UE accessing to a base station.

FIG. 2 is a schematic flowchart of accessing a network device by UE. As shown in FIG. . 2, the step of accessing a network device by UE mainly includes the following steps.

201. The network device periodically sends a synchronization signal block, where the synchronization signal block includes a primary synchronization signal (PSS) and a secondary synchronization signal (SSS).

202. The UE performs cell searching and selects, based on the PSS or the SSS, an optimal cell for residing in. For ease of description, the "optimal cell" is represented as a first cell. In addition, the UE can maintain synchronization with the first cell in terms of time and frequency based on the PSS/SSS.

203. The UE obtains a master information block (MIB) and a system information block (SIB) that are sent by the first cell. A time/frequency domain resource of the MIB is predefined, a time domain resource of the SIB is predefined, and a frequency domain resource of the SIB is scheduled by using a downlink control channel.

204. After obtaining the MIB and the SIB, the UE initiates a random access process and establishes a connection to the first cell. When an access type is contention-based access, an access process includes steps 205, 206, 207, and 208; when an access type is non-contention based access, an access process includes steps 205 and 206.

205. The UE sends a preamble to the network device on a physical random access channel (PRACH). A resource of the preamble is indicated by the SIB.

206. The network device blindly detects the preamble on the PRACH, and if detecting a random access preamble, the network device reports the random access preamble to Media Access Control (MAC), and subsequently feeds back MAC random access response (RAR) signaling on a physical downlink shared channel (PDSCH) in a random access response window.

207. The UE receives the RAR signaling, and may implement uplink synchronization based on a TA adjustment amount in the RAR signaling and transmit a message 3 (Msg 3) on an uplink resource allocated by the network device to the UE. The Msg 3 may carry a radio resource control (RRC) connection establishment message (RRC Connection Request), or may carry an RRC connection re-establishment message (RRC Connection Re-establishment Request).

208. The network device sends a message 4 (Msg 4) to the UE. The network device and the UE finally complete contention resolution by using the Msg 4.

In LTE, resource allocation of a bandwidth part for the UE needs to depend on a value of a system bandwidth. However, in a 5G NR system, the UE may not know the value of the system bandwidth. Therefore, there is an urgent need to design a method for determining, without depending on the value of the system bandwidth, a location of a frequency domain resource of an operating bandwidth.

Figure 3:
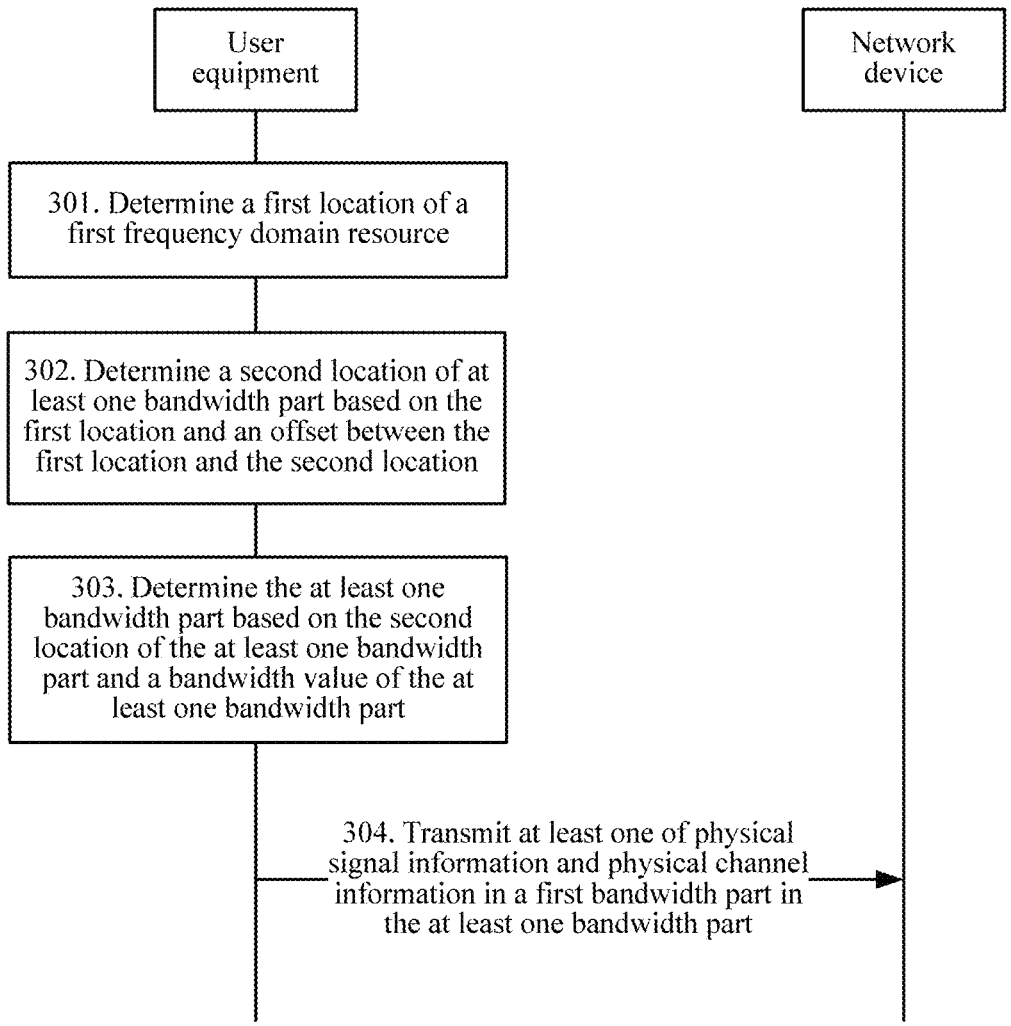
FIG. 3 is a schematic flowchart of a resource allocation method according to an embodiment of this application.

FIG. 3 is a schematic flowchart of a resource allocation method according to an embodiment of this application.

301. User equipment determines a first location of a first frequency domain resource.

Optionally, the first location may be a start location, a central location, or an end location of the first frequency domain resource. Alternatively, the first location may be any location of the first frequency domain resource. This is not limited in this application.

It should be understood that, the start location of the first frequency domain resource may be a minimum resource block (RB) or a minimum resource block group (RBG) of the first frequency domain resource, and correspondingly, the end location is a maximum RB or a maximum RBG of the first frequency domain resource. Alternatively, the start location of the first frequency domain resource may be a maximum RB or RBG of the first frequency domain resource, and correspondingly, the end location is a minimum RB or a minimum RBG of the first frequency domain resource. For ease of description, in the following embodiment, a description is provided by using an example in which the start location is a minimum RB or a minimum RBG.

Optionally, the first frequency domain resource may be a frequency domain resource of a synchronization signal block. The synchronization signal block includes a PSS and an SSS, and may further include a master information block.

302. The user equipment determines a second location of at least one bandwidth part based on the first location and an offset between the first location and the second location.

The user equipment and the network device may preset an offset between the first location of the first frequency domain resource and a second location of each bandwidth part in the at least one bandwidth part. In this way, when the user equipment can determine the first location of the first frequency domain resource, the user equipment can determine the second location of the bandwidth part based on the offset relative to the first location.

It should be noted that the first location of the bandwidth part in this embodiment of this application may be understood as a first location of a frequency domain resource of the bandwidth part.

It should be understood, the bandwidth part in this embodiment of this application may be referred to as an "operating bandwidth".

Optionally, the offset between the first location and the second location may include an offset value and an offset direction between the first location and the second location.

Optionally, a granularity of the offset value may be an RB, a PBG, a subcarrier, a sub-bandwidth, or the like.

Specifically, the granularity of the offset value may be a unit used during calculation of the offset value between the first location and the second location. For example, a second location of a first bandwidth part is obtained by moving the first location of the first frequency domain resource upward or downward by two RBs. In this case, the granularity of the offset value is in the unit of RB.

Optionally, the second location may correspond to the first location. For example, if the first location is the start location of the first frequency domain resource, the second location is a start location of the bandwidth part; if the first location is the central location of the first frequency domain resource, the second location is a central location of the bandwidth part; if the first location is the end location of the first frequency domain resource, the second location is an end location of the bandwidth part. Alternatively, the second location does not correspond to the first location. For example, the first location is the start location of the first frequency domain resource, and the second location is an end location or a central location of the bandwidth part. This is not limited in this application.

It should be noted that offset directions and offset values between a second location of each bandwidth part in the at least one bandwidth part and the first location of the first frequency domain resource may be totally the same, or may be totally different, or may be partially the same. For example, the second location of the first bandwidth part in the at least one bandwidth part and the first location of the first frequency domain resource are shifted upward by two RBs, and a second location of a second bandwidth part in the at least one bandwidth part and the first location of the first frequency domain resource are shifted downward by five RBs. Shifting upward represents shifting in a direction in which a frequency increases, and shifting downward represents shifting in a direction in which a frequency decreases.

Optionally, the user equipment may receive second indication information sent by the network device, and the second indication information is used to indicate the offset between the first location of the first frequency domain resource and the second location of the bandwidth part. In this way, the network device can flexibly indicate the offset of the second location relative to the first location, and the user equipment determines the second location of the bandwidth part based on the second indication information, thereby improving flexibility of resource allocation.

Optionally, the second indication information that is received by the user equipment and that is sent by the network device may be carried in a master information block or carried in a system information block. Alternatively, when the UE is not in a random access process, a base station may carry the second indication information by using radio resource control signaling; or when the UE is in a random access process, a base station may carry the second indication information by using random access response signaling. This is not limited in this application.

It should be noted that the master information block in this embodiment of this application may be a master information block in LTE, for example, the SIB obtained in step 203 in FIG. 2. A name of the master information block is not limited in this application. The system information block may be a system information block in LTE, for example, the MIB obtained in step 203 in FIG. 2. The radio resource control signaling may be the RRC signaling carried in the Msg 3 message in step 207 in FIG. 2, and the random access response signaling may be the RAR signaling in step 206 in FIG. 2.

Figure 4:
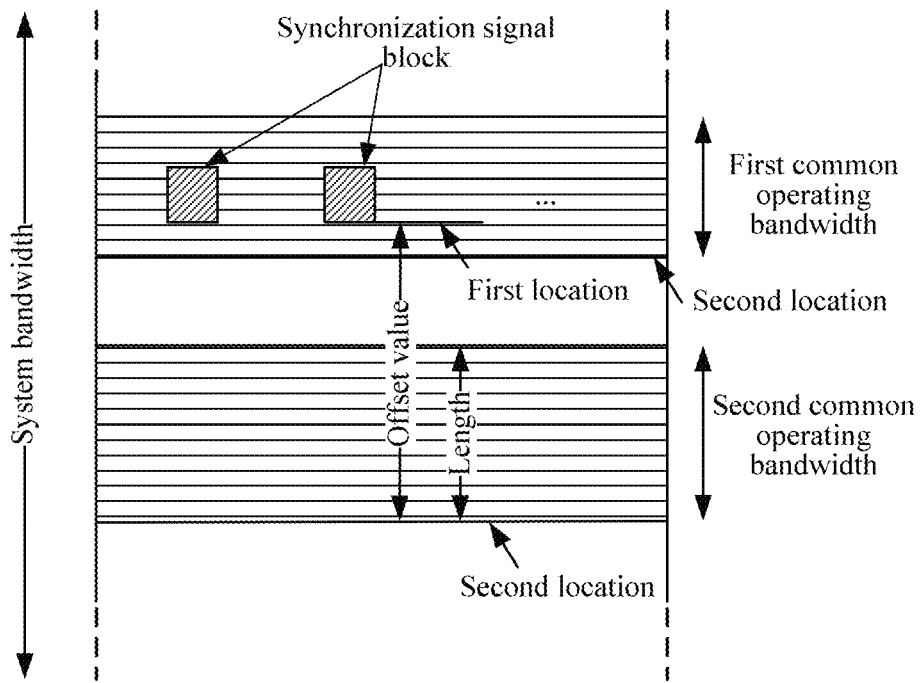
FIG. 4 is a schematic diagram of a specific embodiment according to this application.

Optionally, in an embodiment, when the first frequency domain resource is a frequency domain resource of a synchronization signal block, the bandwidth part may be a common bandwidth part, and the UE may receive at least one of common physical signal information, common physical downlink control channel (PDCCH) information, common physical downlink shared channel (PDSCH) information in the common bandwidth part. The common physical signal may be a primary/secondary synchronization signal, a channel state information reference signal (CSI-RS), and the like. The common PDCCH information may be common radio network temporary identifier (RNTI)-scrambled downlink control information. The common RNTI may be system information-RNTI (SI-RNTI), paging-RNTI (P-RNTI), random access-RNTI (RA-RNTI), and the like. The common PDSCH information may be system information, a paging and random access response, or the like. That is, the UE may determine a second location of the common bandwidth part based on a first location of the synchronization signal block. For example, as shown in FIG. 4, the UE may determine a start location of a second common bandwidth part based on a start location of a resource of the synchronization signal block and based on an offset value and an offset direction between a frequency domain start location of the synchronization signal block and the start location of the second common bandwidth part.

It should be noted that if the common bandwidth part is a common bandwidth part for initial access, that is, the common bandwidth part is used to transmit the synchronization signal block, where for ease of description, the common bandwidth part is referred to as a "first common bandwidth part" below, the granularity of the offset value may be an RB or a PBG, and the second indication information may be carried by using the master information block.

If the common bandwidth part is other common bandwidth parts than the common bandwidth part for initial access, that is, the common bandwidth part may not be used to transmit the synchronization signal block, where for ease of description, the common bandwidth part is referred to as a "second common bandwidth part", the granularity of the offset value may be an RB, a PBG, or a sub-bandwidth, and the second indication information may be carried by using the master information block, the system information block, or the radio resource control signaling.

In addition, this application may be applied to a system including a plurality of common bandwidth parts, and bandwidth sizes of common bandwidth parts in different frequency bands or different system parameter sets are different, and are all less than a bandwidth capability of the UE. The system parameter set may include at least one of such parameters as a subcarrier spacing size, a cyclic prefix length, a transmission time unit length, a symbol length, and a quantity of symbols in a transmission time unit.

Optionally, the bandwidth part may be a segment of continuous resources in a frequency domain. For example, one bandwidth part includes K consecutive subcarriers, where K>0. Alternatively, one bandwidth part is a frequency domain resource in which N non-overlapped consecutive resource blocks are located, where N>0. A subcarrier spacing of the RB is 15 kHz, 30 kHz, 60 kHz, or another value. Alternatively, one bandwidth part is a frequency domain resource in which M non-overlapped consecutive resource block groups (RBG) are located, where M>0. One RBG includes P consecutive RBs, where P>0. A subcarrier spacing of the RB is 15 kHz, 30 kHz, 60 kHz, or another value.

It should be understood that for user equipment, the bandwidth part is not greater than a maximum bandwidth supported by the user equipment. In other words, the bandwidth part is not greater than a bandwidth capability of the user equipment.

It should be noted that a minimum value of the first common bandwidth part is not less than a transmission bandwidth of the synchronization signal block, and a maximum value is not greater than a minimum UE bandwidth capability. The minimum UE bandwidth capability is a minimum value of maximum bandwidths supported by a plurality of UEs, and is specific to a frequency band or a system parameter set. For example, for independent networking NR, a minimum UE bandwidth capability of a frequency band below 6 GHz (in which a corresponding subcarrier spacing includes 15 kHz, 30 kHz, and 60 kHz, a subcarrier spacing of the synchronization signal block is 30 kHz, and a bandwidth is not less than 10 MHz) is not less than 10 MHz. A minimum UE bandwidth capability of a frequency band above 6 GHz (in which a corresponding subcarrier spacing includes 120 kHz and 240 kHz, a subcarrier spacing of the synchronization signal block is 120 kHz, and a bandwidth is not less than 40 MHz) is not less than 40 MHz. For dependent networking NR, the minimum UE bandwidth capability is not less than min (20 MHz, the transmission bandwidth of the synchronous signal block). 20 MHz is the minimum UE bandwidth capability in LTE.

In the following embodiments, when no specific distinguishing difference is made, the common bandwidth part may be the "first common bandwidth part" or may be the "second common bandwidth part".

Optionally, when the common bandwidth part is used to transmit the synchronization signal block, the second location of the common bandwidth part and the first location of the frequency domain resource of the synchronization signal block need to satisfy a particular condition, as shown in FIG. 4.

Specifically, if the first location is a start location of the frequency domain resource of the synchronization signal block, a start location of the common bandwidth part needs to satisfy the following condition:

$$n_{ss}^{low} - W_{min} + m \leq n_{CCRS1}^{low} \leq n_{ss}^{low} + W_{min} - w_1$$

$n_{CCRS1}^{low}$ is the start location of the common bandwidth part, $n_{ss}^{low}$ is the start location of the frequency domain resource of the synchronization signal block, $W_{min}$ is the minimum UE bandwidth capability, m is the transmission bandwidth of the synchronization signal block, and $w_1$ is the common bandwidth part.

Alternatively, if the first location is a start location of the frequency domain resource of the synchronization signal block, a central location of the common bandwidth part needs to satisfy the following condition:

$$n_{ss}^{low} - W_{min} + m + \lfloor w_1/2 \rfloor \leq n_{CCRS1}^{mid} \leq n_{ss}^{low} + W_{min} - \lfloor w_1/2 \rfloor$$

$n_{CCRS1}^{mid}$ is the central location of the common bandwidth part, $n_{ss}^{low}$ is the start location of the frequency domain resource of the synchronization signal block, $W_{min}$ is the minimum UE bandwidth capability, m is the transmission bandwidth of the synchronization signal block, and $w_1$ is the common bandwidth part.

Alternatively, if the first location is a start location of the frequency domain resource of the synchronization signal block, an end location of the common bandwidth part needs to satisfy the following condition:

$$n_{ss}^{low} - W_{min} + m + w_1 \leq n_{CCRS1}^{high} \leq n_{ss}^{low} + W_{min}$$

$n_{CCRS1}^{high}$ is the end location of the common bandwidth part, $n_{ss}^{low}$ is the start location of the frequency domain resource of the synchronization signal block, $W_{min}$ is the minimum UE bandwidth capability, m is the transmission bandwidth of the synchronization signal block, and $w_1$ is the common bandwidth part.

Optionally, in another embodiment, when the first frequency domain resource is the frequency domain resource of the synchronization signal block, the bandwidth part may be a UE specific downlink bandwidth part. The UE may receive at least one of UE specific downlink physical signal information, UE specific PDCCH information, and UE specific PDSCH information in the UE specific downlink bandwidth part. The UE specific downlink physical signal may be a UE specific demodulation reference signal (DMRS); the UE specific PDCCH information may be UE specific RNTI-scrambled downlink control information; the UE specific RNTI may be a cell RNTI (C-RNTI), a temporary C-RNTI, a Semi-Persistence C-RNTI (SPS C-RNTI), or the like; the UE specific PDSCH information may be physical downlink shared channel information scheduled by using UE specific physical downlink control channel information. That is, the UE may determine a second location of the UE specific downlink bandwidth part based on the first location of the frequency domain resource of the synchronization signal block, thereby avoiding resource allocation of the UE specific downlink bandwidth part performed depending on a value of a system bandwidth.

Specifically, when the user equipment is in a random access process, the UE specific downlink bandwidth part may be specifically used to schedule retransmission of a random access message 3, and schedule at least one of UE specific physical downlink control channel information of a random access message 4 and PDSCH information corresponding to the random access message 4. The UE may obtain second indication information by using RAR signaling.

When the user equipment is not in a random access process, the UE specific downlink bandwidth part may be specifically used to transmit UE specific physical downlink control channel information for scheduling uplink/downlink unicast data, and a PDSCH corresponding to downlink unicast data. The UE may obtain second indication information by using RRC signaling.

Optionally, in another embodiment, when the first frequency domain resource is a common bandwidth part, the bandwidth part may be a UE specific downlink bandwidth part or a UE specific uplink bandwidth part. In this case, the second indication information may be carried in RRC signaling or RAR signaling. That is, the UE may determine the UE specific uplink bandwidth part based on a frequency domain resource in the common bandwidth part, or determine a frequency domain resource in the UE specific downlink bandwidth part based on the frequency domain resource in the common bandwidth part, thereby avoiding resource allocation of UE specific bandwidth parts performed depending on a value of a system bandwidth. The UE sends at least one of UE specific uplink physical signal information, UE specific physical uplink control channel (PUCCH) information, and UE specific physical uplink shared channel (PUSCH) information in the UE specific uplink bandwidth part. The UE specific uplink physical signal may be at least one of a DMRS and a sounding reference signal (SRS); the UE specific PUCCH information may be an answer response message and downlink channel sounding feedback information that correspond to the UE specific PDSCH information; and the UE specific PUSCH information may be PUSCH information scheduled by using the UE specific PDCCH information.

Specifically, when the UE is in a random access process, the UE specific uplink bandwidth part may be used to transmit a PUSCH corresponding to the random access message 3, and a PUSCH or a PUCCH corresponding to an answer response message of the random access the message 4. In this case, the second indication information may be carried by using RAR signaling. When the UE is not in a random access process, the UE specific uplink bandwidth part may be used to transmit a PUSCH corresponding to uplink unicast data, and a PUSCH or a PUCCH corresponding to an answer response message of downlink unicast data. In this case, the second indication information may be carried by using RRC signaling.

It should be understood that, in this embodiment of this application, same terms represent a same meaning, and to avoid repetition, details are not described herein again.

Optionally, the first frequency domain resource is a common bandwidth part, and the common bandwidth part is a UE specific downlink bandwidth part. That is, the UE may determine a location of a frequency domain resource in the UE specific downlink bandwidth part based on a location of the frequency domain resource in the common bandwidth part, thereby avoiding resource allocation performed depending on the value of the system bandwidth.

It should be noted that when the first frequency domain resource is the common bandwidth part, the common bandwidth part may be determined by using a location offset relative to the frequency domain resource of the synchronization signal block, or may be determined by using another method. This is not limited in this application.

It should be understood that, the common bandwidth part may be a common bandwidth part for initial access, or may be other common bandwidth parts.

Optionally, the bandwidth part may be a UE specific downlink bandwidth part, and the first frequency domain resource is the frequency domain resource of the synchronization signal block. That is, the UE can determine a location of a resource in the UE specific downlink bandwidth part based on the frequency domain resource of the synchronization signal block, thereby avoiding resource allocation performed depending on the value of the system bandwidth.

Optionally, the bandwidth part may be a UE specific uplink bandwidth part, and the first location of the first frequency domain resource is a central location of an uplink carrier bandwidth. That is, the UE may determine a location of a resource in the UE specific uplink bandwidth part by using the central location of the uplink carrier bandwidth as a reference point, thereby avoiding resource allocation performed depending on the value of the system bandwidth.

It should be noted that the uplink carrier bandwidth may be an uplink system bandwidth, or may be a segment of an uplink transmission bandwidth. Optionally, the central location of the uplink carrier bandwidth may be predefined. For example, there is a preset offset value and offset direction relative to the location of the frequency domain resource of the synchronization signal block. Alternatively, optionally, the central location of the uplink carrier bandwidth may be configured by using a SIB or RRC signaling.

Optionally, the bandwidth part may be a UE specific uplink bandwidth part, and the first frequency domain resource is a UE specific downlink bandwidth part for the UE. That is, the UE may determine a location of a resource in the UE specific uplink bandwidth part by using a location of a frequency domain resource in the UE specific downlink bandwidth part as a reference point, thereby avoiding resource allocation performed depending on the value of the system bandwidth.

303. The user equipment determines the at least one bandwidth part based on a second location of each bandwidth part and a bandwidth size of each bandwidth part.

Bandwidth sizes of bandwidth parts may be the same or may be different. This is not limited in this application.

Optionally, the UE and the network device may agree on bandwidth sizes of different bandwidth parts in advance, or the network device may send third indication information to the UE and notify the UE of the bandwidth size of each bandwidth part.

It should be understood that, the network device may send a plurality of pieces of third indication information, and each piece of third indication information indicates a bandwidth size of a corresponding bandwidth part, or the network device sends a piece of third indication information to indicate the bandwidth size of each bandwidth part.

Optionally, the third indication information and the second indication information may be carried in a same instruction or may be carried in different instructions, or the network device separately sends the third indication information. This is not limited in this application.

304. The user equipment transmits at least one of physical signal information and physical channel information in a first bandwidth part in the at least one bandwidth part.

Optionally, the user equipment may select any one of the at least one bandwidth part as the bandwidth part, and then receive or send at least one of the physical signal information and the physical channel information in the bandwidth part.

Optionally, the network device may select an appropriate bandwidth part as the bandwidth part based on a load value or a busy status of each bandwidth part, and send first indication information to the user equipment. Correspondingly, the user equipment receives the first indication information sent by the network device, and the first indication information is used to indicate the first bandwidth part in the at least one bandwidth part. In this way, the user equipment can determine the bandwidth part based on the first indication information.

It should be noted that the first indication information and the second indication information may be carried in a same instruction or may be carried in different instructions, or the network device separately sends the first indication information. This is not limited in this application.

For example, when the first frequency domain resource is the frequency domain resource of the synchronization signal block, and the bandwidth part is a UE specific downlink bandwidth part or a UE specific uplink bandwidth part, the second indication information is carried in RAR signaling or RRC signaling, and the first indication information may be carried in the SIB.

Optionally, when there are a plurality of bandwidth parts, the user equipment may select at least two bandwidth parts as the bandwidth part. Alternatively, when there is only one bandwidth part, the user equipment may directly use the bandwidth part as the bandwidth part.

Therefore, based on the resource allocation method, the user equipment, and the network device in this embodiment of this application, the first location of the first frequency domain resource is determined, the second location is determined based on the first location and the offset between the first location and the second location of the at least one bandwidth part, and the at least one bandwidth part is determined based on the bandwidth size of the at least one bandwidth part and the second location of the at least one bandwidth part, so that service data is sent in the at least one bandwidth part. In this way, resource allocation performed by the user equipment depending on the value of the system bandwidth is avoided, and the UE can allocate resources when not learning of the system bandwidth.

It should be understood that, in various embodiments of this application, sequence numbers of the foregoing processes do not indicate an execution sequence. The execution sequence of the processes should be determined depending on functions and internal logic of the processes, and should not be construed as any limitation on the implementation processes of the embodiments of this application.

The resource allocation method according to the embodiments of this application is described in detail above with reference to FIG. 3 and FIG. 4, and the UE and the network device according to the embodiments of this application are described in detail below with reference to FIG. 5 and FIG. 6.

Figure 5:
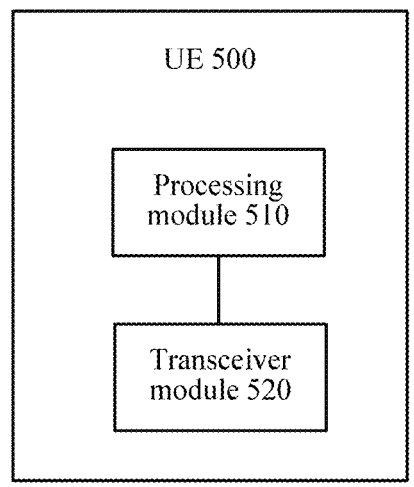
FIG. 5 is a schematic block diagram of user equipment according to an embodiment of this application.
Figure 6:
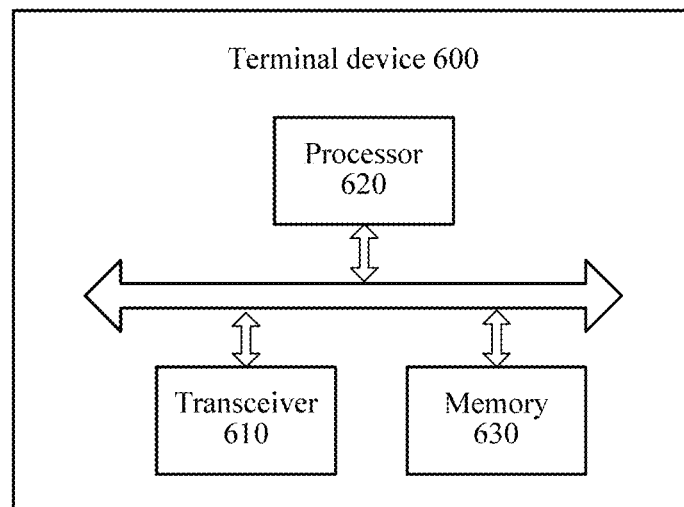
FIG. 6 is a schematic structural diagram of user equipment according to an embodiment of this application.

FIG. 5 is a schematic block diagram of UE 500 according to an embodiment of this application. As shown in FIG. 5, the UE 500 includes: a processing module 510, configured to determine a first location of a first frequency domain resource, where the processing module 510 is further configured to determine a second location of at least one bandwidth part based on the first location and an offset between the first location and the second location; and the processing module 510 is further configured to determine the at least one bandwidth part based on the second location of the at least one bandwidth part and a bandwidth size of the at least one bandwidth part; and a transceiver module 520, configured to transmit at least one of physical signal information and physical channel information in a bandwidth part, where the bandwidth part includes one or more bandwidth parts in the at least one bandwidth part.

Optionally, the offset between the first location and the second location of the at least one bandwidth part includes an offset value and an offset direction between the first location and the second location of the at least one bandwidth part.

Optionally, the first location is a start location, a central location, or an end location of the first frequency domain resource, and the second location is a start location, a central location, or an end location of the bandwidth part.

Optionally, a granularity of the offset value is any one of a resource block RB, a resource block group PBG, or a sub-bandwidth.

Optionally, the transceiver module 520 is further configured to receive first indication information, where the first indication information is used to indicate a first bandwidth part in the at least one bandwidth part; and the processing module 510 is further configured to determine the bandwidth part based on the first indication information.

Optionally, the transceiver module 520 is further configured to receive second indication information, where the second indication information is used to indicate the offset value and the offset direction between the first location and the second location.

Optionally, the transceiver module 520 is specifically configured to receive a master information block MIB, where the MIB carries the second indication information; or receive a system information block SIB, where the SIB carries the second indication information.

Optionally, when the UE is not in a random access process, the transceiver module 520 is further configured to receive radio resource control RRC signaling, where the RRC signaling carries the second indication information.

Optionally, when the UE is in a random access process, the transceiver module 520 is further configured to receive random access response RAR signaling, where the RAR signaling carries the second indication information.

Optionally, the bandwidth part is a common bandwidth part, and the common bandwidth part is used for the user equipment UE to receive at least one of common physical signal information, common physical downlink control channel information, and common physical downlink shared channel information.

Optionally, the bandwidth part is a UE specific downlink bandwidth part, and the UE specific downlink bandwidth part is used for the UE to receive at least one of UE specific downlink physical signal information, UE specific physical downlink control channel information, and UE specific physical downlink shared channel information.

Optionally, the first frequency domain resource is a frequency domain resource of a synchronization signal block.

Optionally, the first frequency domain resource is a UE specific downlink bandwidth part, and the bandwidth part is a UE specific uplink bandwidth part. The UE specific downlink bandwidth part is used for the UE to receive at least one of UE specific physical downlink control channel information and UE specific physical downlink shared channel information, and the UE specific uplink bandwidth part is used for the UE to send at least one of UE specific uplink physical signal information, UE specific physical uplink control channel information, and UE specific physical uplink shared channel information.

Optionally, the first location is a central location of the uplink carrier bandwidth and the bandwidth part is the UE specific uplink bandwidth part. The UE specific uplink bandwidth part is used for the UE to send at least one of the UE specific uplink physical signal information, the UE specific physical uplink control channel information, and the UE specific physical uplink shared channel information.

Optionally, the first frequency domain resource is a common bandwidth part and the bandwidth part is a UE specific uplink bandwidth part or a UE specific downlink bandwidth part. The UE specific downlink bandwidth part is used for the UE to receive at least one of UE specific downlink physical signal information, UE specific physical downlink control channel information, and UE specific downlink shared channel information, and the UE specific uplink bandwidth part is used for the UE to send at least one of UE specific uplink physical signal information, UE specific physical uplink control channel information, and UE specific physical uplink shared channel information.

Therefore, the UE in this embodiment of this application determines the first location of the first frequency domain resource, determines the second location based on the first location and the offset between the first location and the second location of each bandwidth part in the at least one bandwidth part, determines the frequency domain resource in the at least one bandwidth part based on the second location of the at least one bandwidth part and the bandwidth size of the at least one bandwidth part, and transmits at least one of the physical signal information and the physical channel information in the first bandwidth part in the at least one bandwidth part. In this way, the UE can determine the location of the frequency domain resource in the bandwidth part without depending on the value of the system bandwidth.

It should be understood that, the UE 500 in this embodiment of this application may correspond to the UE in the resource allocation method in the embodiments of this application, and the foregoing management operations and/or functions and other management operations and/or functions of modules of the UE 500 are intended to implement corresponding steps of the foregoing methods. For brevity, details are not described herein again.

The transceiver module 520 in this embodiment of this application may be implemented by a transceiver, and the processing module 510 may be implemented by a processor. As shown in FIG. 6, UE 600 may include a transceiver 610, a processor 620, and a memory 630. The memory 630 may be configured to store indication information, or may be configured to store code, an instruction, and the like that are to be executed by the processor 620.

Figure 7:
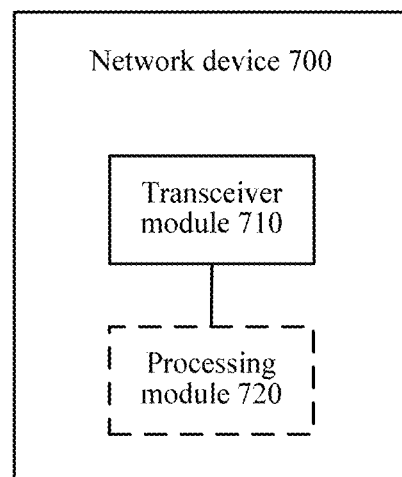
FIG. 7 is a schematic block diagram of a network device according to an embodiment of this application.

FIG. 7 is a schematic block diagram of a network device 700 according to an embodiment of this application. As shown in FIG. 7, the network device 700 includes: a transceiver module 710, configured to send second indication information, where the second indication information is used to indicate an offset between a first location of a first frequency domain resource and a second location of at least one bandwidth part, where a transceiver module 710 is further configured to transmit at least one of physical signal information and physical channel information in a first bandwidth part in the at least one bandwidth part.

Optionally, the network device 700 further includes a processing module 720, configured to determine the first bandwidth part in the at least one bandwidth part; and the transceiver module 710 is further configured to send first indication information, where the first indication information is used to indicate the first bandwidth part in the at least one bandwidth part.

Therefore, the network device in this embodiment of this application flexibly configures the offset between the first location and the second location by using the second indication information, so that the UE determines the second location based on the second indication information, thereby improving flexibility of resource allocation.

Optionally, the offset between the first location and the second location of the at least one bandwidth part may include an offset value and an offset direction between the first location and the second location of the at least one bandwidth part.

Optionally, the first location is a start location, a central location, or an end location of the first frequency domain resource, and the second location is a start location, a central location, or an end location of the bandwidth part.

Optionally, a granularity of the offset value is any one of a resource block RB, a resource block group PBG, or a sub-bandwidth.

Optionally, the sending second indication information includes: sending a master information block, where the master information block carries the second indication information; or sending a system information block, where the system information block carries the second indication information.

Optionally, when the UE is not in a random access process, the sending second indication information includes: sending radio resource control signaling, where the radio resource control signaling carries the second indication information.

Optionally, when the UE is in a random access process, the sending second indication information includes: sending random access response signaling, where the random access response signaling carries the second indication information.

Optionally, the first frequency domain resource is a frequency domain resource of a synchronization signal block.

Optionally, the bandwidth part is a common bandwidth part, and the common bandwidth part is used for the user equipment UE to receive at least one of common physical signal information, common physical downlink control channel information, and common physical downlink shared channel information.

Optionally, if the common bandwidth part is used to transmit the synchronization signal block, a start location of the common bandwidth part indicated by the second indication information that is sent by the network device and a start location of the synchronization signal block need to satisfy the following condition: $n_{ss}^{low} - W_{min} + m \leq n_{CCRS1}^{low} \leq n_{ss}^{low} + W_{min} - w_1$. $n_{CCRS1}^{low}$ is the start location of the common bandwidth part, $n_{ss}^{low}$ is the start location of the frequency domain resource of the synchronization signal block, $W_{min}$ is a minimum UE bandwidth capability, m is a transmission bandwidth of the synchronization signal block, and $w_1$ is the common bandwidth part.

Optionally, if the common bandwidth part is used to transmit the synchronization signal block, a central location of the common bandwidth part indicated by the second indication information that is sent by the network device and a start location of the synchronization signal block need to satisfy the following condition: $n_{ss}^{low} - W_{min} + m + \lfloor w_1/2 \rfloor \leq n_{CCRS1}^{mid} \leq n_{ss}^{low} + W_{min} - \lfloor w_1/2 \rfloor$. $n_{CCRS1}^{mid}$ is the central location of the common bandwidth part, $n_{ss}^{low}$ is the start location of the frequency domain resource of the synchronization signal block, $W_{min}$ is a minimum UE bandwidth capability, m is a transmission bandwidth of the synchronization signal block, and $w_1$ is the common bandwidth part.

Optionally, if the common bandwidth part is used to transmit the synchronization signal block, an end location of the common bandwidth part indicated by the second indication information that is sent by the network device and a start location of the synchronization signal block need to satisfy the following condition: $n_{ss}^{low} - W_{min} + m + w_1 \leq n_{CCRS1}^{high} \leq n_{ss}^{low} + W_{min}$. $n_{CCRS1}^{high}$ is the end location of the common bandwidth part, $n_{ss}^{low}$ is the start location of the frequency domain resource of the synchronization signal block, $W_{min}$ is a minimum UE bandwidth capability, m is a transmission bandwidth of the synchronization signal block, and $w_1$ is the common bandwidth part.

Optionally, the bandwidth part is a UE specific downlink bandwidth part, and the UE specific downlink bandwidth part is used for the UE to receive at least one of UE specific downlink physical signal information, UE specific physical downlink control channel information, and UE specific physical downlink shared channel information.

Optionally, the first frequency domain resource is a UE specific downlink bandwidth part, and the bandwidth part is a UE specific uplink bandwidth part. The UE specific downlink bandwidth part is used for the UE to receive at least one of UE specific physical downlink control channel information and UE specific physical downlink shared channel information, and the UE specific uplink bandwidth part is used for the UE to send at least one of UE specific uplink physical signal information, UE specific physical uplink control channel information, and UE specific physical uplink shared channel information.

Optionally, the first location is a central location of the uplink carrier bandwidth and the bandwidth part is the UE specific uplink bandwidth part. The UE specific uplink bandwidth part is used for the UE to send at least one of the UE specific uplink physical signal information, the UE specific physical uplink control channel information, and the UE specific physical uplink shared channel information.

Optionally, the first frequency domain resource is a common bandwidth part and the bandwidth part is a UE specific uplink bandwidth part or a UE specific downlink bandwidth part. The UE specific downlink bandwidth part is used for the UE to receive at least one of UE specific downlink physical signal information, UE specific physical downlink control channel information, and UE specific downlink shared channel information, and the UE specific uplink bandwidth part is used for the UE to send at least one of UE specific uplink physical signal information, UE specific physical uplink control channel information, and UE specific physical uplink shared channel information.

It should be understood that, the network device 700 in this embodiment of this application may correspond to the network device in the resource allocation method in the embodiments of this application, and the foregoing management operations and/or functions and other management operations and/or functions of modules of the network device 700 are intended to implement corresponding steps of the foregoing methods. For brevity, details are not described herein again.

Figure 8:
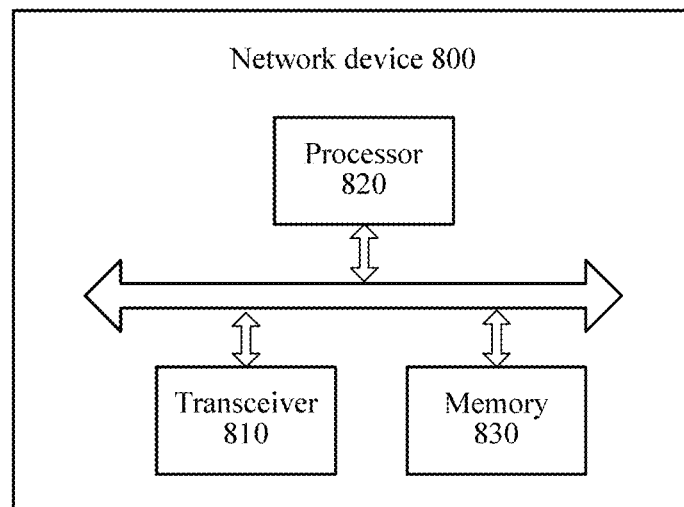
FIG. 8 is a schematic structural diagram of a network device according to an embodiment of this application.

The transceiver module 710 in this embodiment of this application may be implemented by a transceiver, and the processing module 720 may be implemented by a processor. As shown in FIG. 8, a network device 800 may include a transceiver 810, a processor 820, and a memory 830. The memory 830 may be configured to store indication information, or may be configured to store code, an instruction, and the like that are to be executed by the processor 820.

It should be understood that the processor 620 or the processor 820 may be an integrated circuit chip and have a signal processing capability. In an implementation process, steps in the foregoing method embodiments can be implemented by using a hardware integrated logical circuit in the processor, or by using instructions in a form of software. The processor 510 may be a general purpose processor, a digital signal processor (DSP), an application-specific integrated circuit (ASIC), a field programmable gate array (FPGA) or another programmable logic device, a discrete gate or a transistor logic device, or a discrete hardware component. All methods, steps, and logical block diagrams disclosed in this embodiment of the present invention may be implemented or performed. The general purpose processor may be a microprocessor, or the processor may be any conventional processor or the like. Steps of the methods disclosed in the embodiments of the present invention may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 630 or the memory 830 in the embodiments of the present invention may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the storage of the system and the method described in this specification aims to include, but is not limited to, these and any other proper storage.

Figure 9:
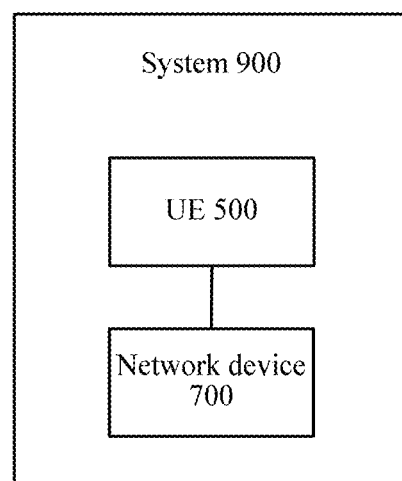
FIG. 9 is a schematic block diagram of a system according to an embodiment of this application.

An embodiment of this application further provides a system. As shown in FIG. 9, the system 900 includes: the UE 500 according to the embodiments of this application and the network device 700 according to the embodiments of this application.

An embodiment of this application further provides a computer storage medium, and the computer storage medium may store a program instruction for executing any of the foregoing methods.

Optionally, the storage medium may be specifically the memory 630 or 830.

A person of ordinary skill in the art may be aware that, in combination with the examples described in the embodiments disclosed in this specification, units and algorithm steps may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving a first offset, wherein the first offset is between a first location of a frequency domain resource of a synchronization signal block and a second location of a common bandwidth part; and
receiving a second offset, wherein the second offset is between the second location of the common bandwidth part and a third location of a bandwidth part for a terminal, and the common bandwidth part comprises the bandwidth part for the terminal; and
wherein the bandwidth part for the terminal is usable for receiving or sending information, and the information comprises physical signal information, physical control channel information, or physical shared channel information.

2. The method according to claim 1, wherein:
the first location is a start location of the frequency domain resource of the synchronization signal block;
the second location is a start location of the common bandwidth part; and
the third location is a start location of the bandwidth part for the terminal.

3. The method according to claim 1, wherein receiving the first offset comprises:
receiving the first offset from a network device, wherein the first offset is received using:
a system information block;
a master information block; or
radio resource control signaling.

4. The method according to claim 1, wherein receiving the second offset comprises:
receiving radio resource control signaling from a network device, wherein the radio resource control signaling comprises the second offset.

5. The method according to claim 1, wherein:
a granularity of the first offset is a resource block, and the granularity of the first offset is an offset unit value based on an offset value or an offset direction; and
a granularity of the second offset is a resource block, and the granularity of the second offset is an offset unit value based on an offset value or an offset direction.

6. The method according to claim 1, wherein the common bandwidth part is one resource block.

7. The method according to claim 1, wherein the bandwidth part for the terminal is one resource block.

8. A method, comprising:
sending a first offset, wherein the first offset is between a second location of a common bandwidth part and a first location of a frequency domain resource of a synchronization signal block; and
sending a second offset, wherein the second offset is between a third location of a bandwidth part for a terminal and the second location of the common bandwidth part; and
wherein the bandwidth part for the terminal is usable for receiving or sending information, and the information comprises physical signal information, physical control channel information, or physical shared channel information.

9. The method according to claim 8, wherein:
the first location is a start location of the frequency domain resource of the synchronization signal block;
the second location is a start location of the common bandwidth part; and
the third location is a start location of the bandwidth part for the terminal.

10. The method according to claim 8, wherein sending the first offset comprises:
sending the first offset to the terminal, wherein the first offset is sent using:

a system information block;
a master information block; or
radio resource control signaling.

11. The method according to claim 8, wherein sending the second offset comprises:
sending radio resource control signaling to the terminal, wherein the radio resource control signaling comprises the second offset.

12. The method according to claim 8, wherein:
a granularity of the first offset is a resource block, and the granularity of the first offset is an offset unit value based on an offset value or an offset direction; and
a granularity of the second offset is a resource block, and the granularity of the second offset is an offset unit value based on an offset value or an offset direction.

13. The method according to claim 8, wherein the common bandwidth part is one resource block.

14. The method according to claim 8, wherein the bandwidth part for the terminal is one resource block.

15. An apparatus, comprising:
a processor; and
a non-transitory computer-readable storage medium storing a program to be executed by the processor, the program including instructions for:
receiving a first offset, wherein the first offset is between a first location of a frequency domain resource of a synchronization signal block and a second location of a common bandwidth part; and
receive a second offset, wherein the second offset is between the second location of the common bandwidth part and a third location of a bandwidth part for the apparatus, and the common bandwidth part comprises the bandwidth part for the apparatus; and
wherein the bandwidth part for the apparatus is usable for sending or receiving information, and the information comprises physical signal information, physical control channel information, or physical shared channel information.

16. The apparatus according to claim 15, wherein:
the first location is a start location of the frequency domain resource of the synchronization signal block;
the second location is a start location of the common bandwidth part; and
the third location is a start location of the bandwidth part for the apparatus.

17. The apparatus according to claim 15, wherein the first offset is received using:
a system information block;
a master information block; or
radio resource control signaling.

18. The apparatus according to claim 15, wherein the second offset is received using radio resource control signaling.

19. The apparatus according to claim 15, wherein
a granularity of the first offset is a resource block, and the granularity of the first offset is an offset unit value based on an offset value or an offset direction; and
a granularity of the second offset is a resource block, and the granularity of the second offset is an offset unit value based on an offset value or an offset direction.

20. The apparatus according to claim 15, wherein the common bandwidth part is one resource block.

21. The apparatus according to claim 15, wherein the bandwidth part for the apparatus is one resource block.

22. An apparatus, comprising:
a processor; and
a non-transitory computer-readable storage medium storing a program to be executed by the processor, the program including instructions for:
sending a first offset, wherein the first offset is between a second location of a common bandwidth part and a first location of a frequency domain resource of a synchronization signal block; and
send a second offset, wherein the second offset is between a third location of a bandwidth part for a terminal and the second location of the common bandwidth part; and
wherein the bandwidth part for the terminal is usable for sending or receiving information, and the information comprises physical signal information, physical control channel information, or physical shared channel information.

23. The apparatus according to claim 22, wherein:
the first location is a start location of the frequency domain resource of the synchronization signal block;
the second location is a start location of the common bandwidth part; and
the third location is a start location of the bandwidth part for the terminal.

24. The apparatus according to claim 22, wherein the first offset is sent from the apparatus to the terminal using:
a system information block;
a master information block; or
radio resource control signaling.

25. The apparatus according to claim 22, wherein the second offset is sent from the apparatus to the terminal using radio resource control signaling.

26. The apparatus according to claim 22, wherein
a granularity of the first offset is a resource block, and the granularity of the first offset is an offset unit value based on an offset value or an offset direction; and
a granularity of the second offset is a resource block, and the granularity of the second offset is an offset unit value based on an offset value or an offset direction.

27. The apparatus according to claim 22, wherein the common bandwidth part is one resource block.

28. The apparatus according to claim 22, wherein the bandwidth part for the terminal is one resource block.

* * * * *